United States Patent [19]
Heilhecker et al.

[11] 3,736,007
[45] May 29, 1973

[54] SWIVEL

[75] Inventors: Joe K. Heilhecker, Bellaire; William C. Maurer; Everett H. Lock, both of Houston, all of Tex.

[73] Assignee: Esso Production Research Company, Houston, Tex.

[22] Filed: Aug. 23, 1971

[21] Appl. No.: 173,897

[52] U.S. Cl. ............. 285/31, 277/188, 285/110, 285/275, 285/351
[51] Int. Cl. ............................................. F16l 27/00
[58] Field of Search ................. 285/31, 32, 275, 285/272, 110, 111, 351; 277/188

[56] References Cited
UNITED STATES PATENTS

| | | | |
|---|---|---|---|
| 2,676,788 | 4/1954 | Davidson et al. | 285/275 X |
| 2,036,537 | 4/1936 | Otis | 277/188 X |
| 2,349,170 | 5/1944 | Jackman | 277/188 X |
| 3,632,121 | 1/1972 | Wahlmark | 277/188 X |
| 2,844,421 | 7/1958 | Hayman | 277/188 X |
| 2,394,715 | 2/1946 | Phillips | 277/188 X |
| 2,764,428 | 9/1956 | Murphy | 277/275 |
| 2,973,978 | 3/1961 | Oppenheim | 277/188 |
| 3,103,366 | 9/1963 | Dunn | 277/188 X |
| 2,765,204 | 10/1956 | Josephson | 277/188 |

Primary Examiner—Thomas F. Callaghan
Attorney—James A. Reilly, John B. Davidson, Robert L. Graham et al.

[57] ABSTRACT

A washpipe assembly for use in drilling swivels wherein the assembly includes a washpipe, a sleeve for mounting the washpipe to the swivel body, and packing for sealing the space between the sleeve and washpipe. The packing comprises a plastic ring and a metal anti-extrusion ring mounted in a recess formed in the plastic ring.

7 Claims, 3 Drawing Figures

JOE K. HEILHECKER
WILLIAM C. MAURER
EVERETT H. LOCK
INVENTORS

BY Robert L. Graham

ATTORNEY

JOE K. HEILHECKER
WILLIAM C. MAURER
EVERETT H. LOCK
INVENTORS

BY Robert L. Graham

ATTORNEY

SWIVEL

BACKGROUND OF THE INVENTION

1. Field of the Invention:

This invention relates generally to swivels. In one aspect, it relates to an improved washpipe assembly usable in drilling swivels.

2. Description of the Prior Art:

In oilfield drilling operations which employ rotary drilling techniques, drilling fluid is circulated through the drill string and up the borehole returning to the system pit or tanks. The drilling fluids serve several important functions such as cooling the bit, carrying the cuttings away from the bit, plastering the borehole wall to prevent sluffing or caving of formations, and providing a hydrostatic head for controlling the influx of formation fluids. The swivel which is an essential component in all rotary drilling systems functions to rotatably support the drill string and to deliver drilling fluid to the rotating drill string. The swivel normally contains a stationary support housing suspended on the drilling rig hoisting equipment and a rotating stem from which is suspended the drill string. Drilling fluid is delivered to a flow course formed in the swivel housing by means of a drilling hose. A tube, referred to as a washpipe, interconnects the flow course of the stationary housing and the interior of the rotating stem and thus serves to conduct fluid from the stationary portion to the rotating portion of the swivel. Packing rings positioned about the outer periphery of the washpipe and maintained in place by a mounting sleeve provides a dynamic seal between the relatively rotating members and prevents the leakage of fluid. The packing rings normally are composed of composite materials or fiber reinforced elastomer. The washpipe, packing and mounting sleeves normally are assembled as a unit to permit rapid replacement when packing rings become worn.

When operated at conventional drilling pressures, e.g. pump pressures below about 2,500 psi, the swivel described above performs satisfactorily, requiring only occasional replacement of the washpipe assembly. The recent trend in high pressure drilling, however, has necessitated changes in the design of conventional fluid handling equipment. For most system components, these changes have resulted merely in the use of higher quality materials and/or increases in well thickness of the pressurized components. A variety of high pressure static seals are available for coupling stationary components. The swivel, however, must provide a dynamic seal between the relatively rotating members. High pressure tests have shown that the dynamic seals conventionally used in washpipe assemblies fail within a relatively short period of time—usually less than one hour. It is thus seen that the use of conventional washpipe assemblies in high pressure drilling would result in frequent and time consuming shutdowns.

SUMMARY OF THE INVENTION

The improved swivel of the present invention is capable of operating at high pressures for long periods of time. A novel feature of the invention relates to an improved washpipe packing assembly employed in the swivel. Briefly, the packing assembly comprises a plastic ring and a metal anti-extrusion ring. One end of the plastic ring is provided with a recess configurated for receiving the anti-extrusion ring in close conformity. The plastic ring containing the anti-extrusion ring is maintained in sealing relation about the swivel washpipe by means of a mounting sleeve. In the assembled condition, the anti-extrusion ring bears against an end wall of the mounting sleeve and against the outer periphery of the washpipe covering the mounting sleeve and against the outer periphery of the washpipe covering the gap therebetween. The plastic ring surrounding the outer periphery of the anti-extrusion ring and bearing against a top surface thereof serves several important functions: it provides a backup structure for the anti-extrusion ring preventing it from seizing to the mounting sleeve; it provides a radial component of force on the anti-extrusion ring forcing it into engagement with the washpipe; and it provides lubrication for the sliding surfaces of the assembly.

The plastic ring preferably is composed on a homogeneous plastic having a relatively low coefficient of friction. The fluoroplastics, particularly polytetrafluoroethylene, are the preferred materials for the plastic ring. Other usable plastics include nylon, acetal and polycarbonate resins.

The anti-extrusion ring can be composed of a relatively soft bearing material such as bronze, bronze alloys, or copper alloys. These metals deform under stress and exhibit good conformability and embedability.

High pressure tests have shown that a swivel containing the improved washpipe assembly can be operated at pressures as high as 15,000 psi for several hours.

DESCRIPTION OF THE PREFERRED EMBODIMENTS

The present invention will be described in connection with a rotary drilling swivel, but it should be understood that the invention can also be applied in other types of swivels where it is desired to couple two relatively rotatable, fluid conducting members in a fluid tight assembly.

Figure 1:
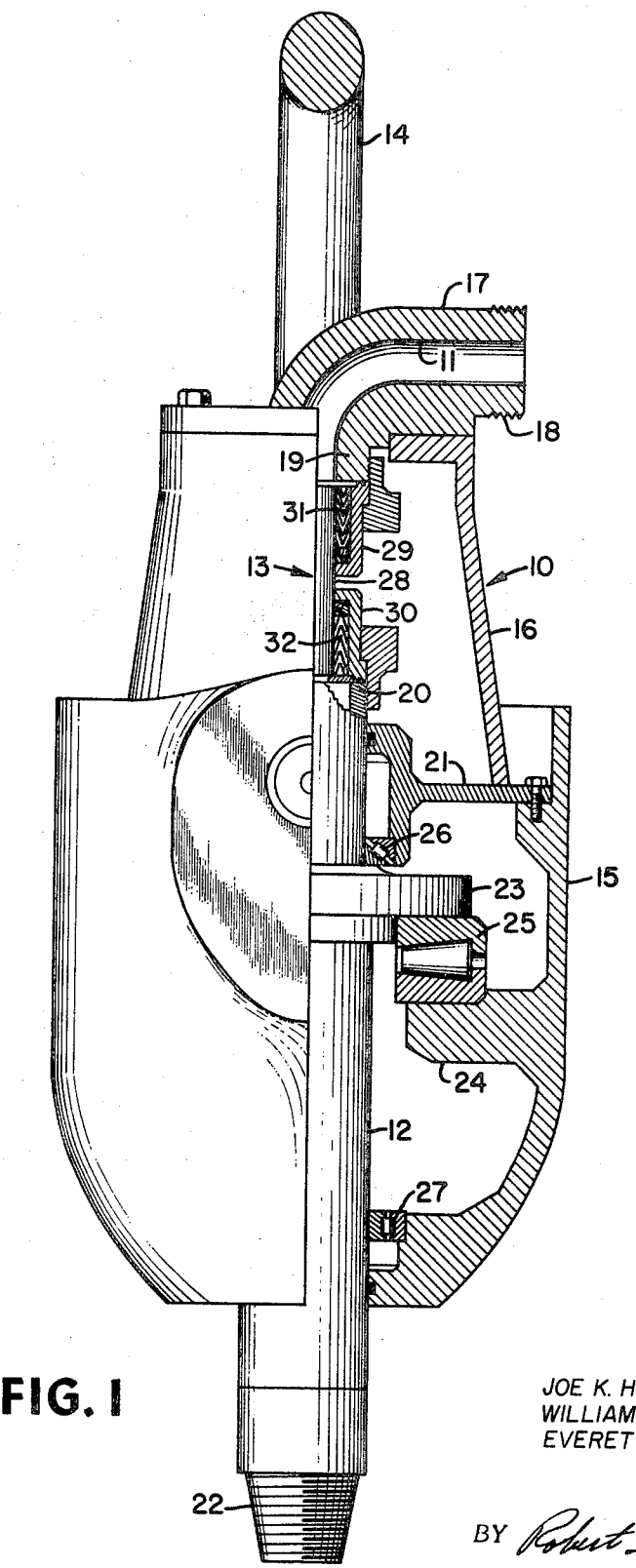
FIG. 1 is an elevational view of a drilling swivel with portions cut away to illustrate details of the washpipe assembly.

As shown in FIG. 1, the main components of a swivel include an outer stationary body 10 having a flow course 11 formed therein, a tubular stem 12 journaled to the body 10, a washpipe assembly 13 for interconnecting the flow course 11 and the interior of the stem 12, and a bail 14 for suspending the swivel on the drilling rig hoisting equipment.

The swivel body 10 is normally fabricated from three steel castings: a lower main housing 15, a housing cap or "bonnet" 16, and a fluid inlet connecting member 17. The parts 15, 16, and 17 are normally made separately and assembled as a unit by bolts or other fasteners. The fluid inlet connecting member 17, referred to in the art as a "gooseneck", defines the flow course 11 and is provided with a threaded outer end 18 for attachment to the drilling hose (not shown). The flow course 11 discharges through a downwardly opening projection 19, the lower end of which is threaded for connection to the washpipe assembly 13.

The stem 12 extends through the main housing 15 and has an upper threaded end 20 projecting above a closure plate 21 of cap 16. The stem 12 extends downwardly through the lower end of housing 15 terminating in threaded end 22. The kelley joint and the remainder of the drill string are suspended from end 22.

A flange 23 secured to the stem 12 is journaled to an internal shoulder 24 of housing 15 by means of a thrust bearing 25. Upper and lower radial bearings 26 and 27 maintain the stem 12 in proper axial alignment within housing 15. The housing 15 is normally filled with oil to provide lubrication for bearings 25, 26, and 27.

The swivel thus comprises two relatively rotatable, fluid conducting members which must be coupled together in a fluid tight assembly. This is the function of the washpipe assembly 13.

The washpipe assembly 13 interconnects the downwardly extending projection 19 of member 17 and the upwardly projecting end 20 of stem 12. This assembly includes a washpipe 28, mounting sleeves 29 and 30 for connecting the tube to the swivel, and packing assemblies 31 and 32 for sealing the space between the sleeves and the washpipe. The washpipe 28 is a short, hardened steel tube smoothly ground to minimize packing wear. In many conventional swivels, the washpipe 28 is fixed to the connecting member 17 and remains stationary therewith. This type of connection requires a static seal at the joint. In the preferred embodiment of the present invention, however, the washpipe 28 is provided with a dynamic seal at both ends of the washpipe 28 so that the washpipe 28 can remain stationary with the connecting member 17 or can rotate with the stem 12 depending upon the drag forces imposed thereon. In order to facilitate replacement of the packing assemblies, the washpipe assembly 13 is normally constructed as a unit such that when leakage occurs, the worn unit can be withdrawn and a new one installed.

In describing this preferred embodiment, it will be assumed that the drag forces on the washpipe 28 are such that it rotates with the stem 12. Thus the packing 32 in the lower sleeve 30 acts as a static seal and the packing 31 in the upper sleeve 29 acts as a dynamic seal. Because wear is more pronounced between moving parts, the dynamic seal tends to fail first in the washpipe assembly 13. This is particularly true when operating at extremely high pressures and when the drilling fluid contains abrasives that tend to cut or abrade the packing materials.

Figure 2:
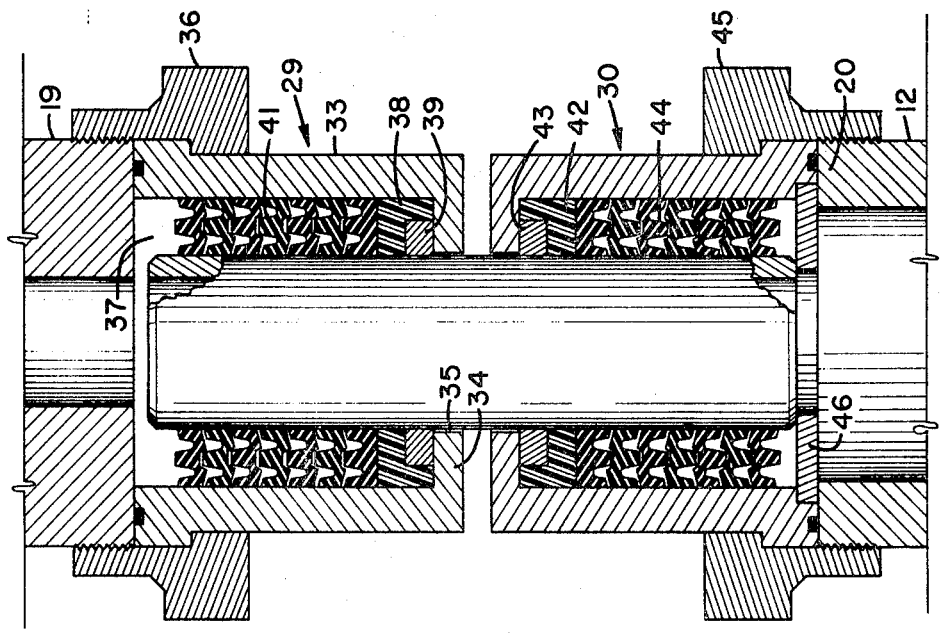
FIG. 2 is an enlarged sectional view of the washpipe assembly shown in FIG. 1.

Referring to FIG. 2, the sleeve 29 has a cylindrical section 33 arranged in axial abutting relation with the projection 19 and an end wall 34. An opening 35 through end wall 34 is sized in relation to the outside diameter of washpipe 28 to permit free relative rotation between the washpipe 28 and sleeve 29. The clearance between these two members normally will be between about 10 and 30 mils. A packing nut 36 threadedly connected to the projection 19 secures the sleeve 29 to the stationary portion of the swivel. An O-ring mounted in a suitable gland formed in the upper end of sleeve 29 provides a static seal between the abutting surfaces. The sleeve 29 in combination with the washpipe 28 defines an annular space 37 closed at one end by the end wall 34 and open at the other end in fluid communication with the interior of washpipe 28. The packing assembly 31 functions to seal the gap between the washpipe 28 and end wall 34 and comprises a series of stacked rings sized to fit into the annular space 37. The rings include a plastic ring 38 and a metal anti-extrusion ring 39.

Figure 3:
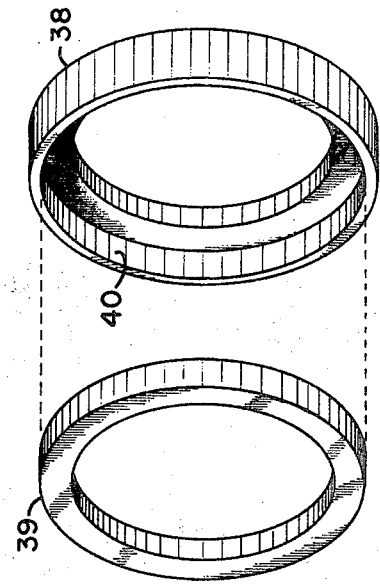
FIG. 3 is an exploded perspective view of the sealing rings employed in the washpipe assembly shown in FIG. 2.

As shown in FIG. 3, the plastic ring 38 is a cylindrically shaped member having an axially extending recess 40 formed in one end thereof. The outside and inside diameters of the plastic ring 38 are sized to fit in close conformity with the cylindrical walls defining annular space 37. The recess 40 is shaped to receive the metal anti-extrusion ring 39. The axial dimension of the recess 40 is about the same as that of the ring 39 so that their end surfaces lie about flush with each other as shown in FIG. 2. The inside diameter of the recess 40 can be about the same as the outside diameter of the ring 39. The skirt portion of the plastic ring surrounding the outer periphery of the metal ring 39 should be sufficiently thick to provide peripheral backing for the metal ring 39. Thicknesses between about 1/16 and ¼ inch are satisfactory for most applications. The radial dimensions of the plastic ring and metal ring are sized to permit the rings in assembled condition to slide through the annular space 37 and seat on end wall 34. Clearances of about 2 to 10 mils between the rings and confining cylindrical walls are satisfactory. When inserted in the space 37, the metal ring covers the gap between the wall 34 and washpipe 28 thereby preventing the extrusion of the plastic material as pressure is applied to the assembly. The plastic ring 38 can be molded or machined from any one of the synthetic or natural resins normally used in bearing service. These plastics include nylon, acetal and polycarbonate resins, fluoroplastics and the like. The fluoroplastics, particularly polytetrafluoroethylene, are preferred, however, because of their anti-stick properties, low coefficient of friction, and high temperature resistance. All of these properties are important in the functioning of the packing assembly.

The anti-extrusion ring 39 is circumferentially continuous and preferably is machined from a relatively soft bearing metal (Brinnel hardness less than about 100) such as bronze, bronze alloy, copper alloy, and the like. The low modulus of elasticity of these metals provide good conformability and embedability at the rubbing surface. Phosphor bronze (SAE 660) has performed particularly well in the packing assembly.

The packing assembly can also include conventional self-sealing rings shown as 41 in FIG. 2. These rings can be made of composite material or elastomers containing fibers of cotton, rayon, flax, jute, hemp, wool, and the like.

The packing is mounted by inserting the plastic ring 38 containing the metal anti-extrusion ring 39 in recess 40 through the annular space 37 until the metal ring 39 engages the end wall 34. A plurality—usually 3-7—of the conventional self-sealing rings 41, if used, can then be inserted into the annular space 37. The first of these rings engages the plastic ring 38 and can be provided with a flat surface for distributing the load thereon. The lower packing assembly 32 can be identical to the upper packing assembly 31 including plastic ring 42, anti-extrusion ring 43 and self-sealing conventional rings 44. The sleeve 30 is secured to the upper end 20 of stem 12 by packing nut 45. A washer 46 clamped between the sleeve 30 and stem end 20 maintains the washpipe 28 in proper position.

Under operating conditions, the plastic ring 38 surrounding the anti-extrusion ring 39 serves three important functions: 1. it provides for an inward radial component of force on the anti-extrusion ring 39 to force it into sealing engagement with the washpipe 28; 2. it prevents the anti-extrusion ring 39 from seizing to the sleeve 29; and 3. it provides lubrication at the sliding surface between the ring 39 and washpipe 28 or between the ring 39 and end wall 34.

When the washpipe assembly 13 is connected to the swivel and the system is pressurized, hydraulic force is exerted on the packing. At high pressures, the plastic ring 38 grossly deforms acting much in the manner of a viscous fluid. It should be noted that the compressive strength of polytetrafluoroethylene is only 1,700 psi which is substantially less than the pressure imposed on the packing under high pressure drilling conditions. As mentioned above, the hydraulic force transmitted through the plastic ring 38 imposes a radial component of force on the anti-extrusion ring 39. This force causes the anti-extrusion ring 39 to yield inwardly conforming to the configuration of the washpipe surface and automatically compensates for wear on the anti-extrusion ring 39. The backing provided by the skirt portion of the plastic ring 38 prevents the ring 39 from wedging between the washpipe 28 and sleeve 29. The wear pattern on rings tested indicated that the anti-extrusion ring 39 at times remained stationary with the sleeve 29 and at other times rotated with the washpipe 28. In either situation, however, the plastic material metering between rubbing surfaces provides lubrication therefor.

The following test illustrates the effectiveness of the present invention. A washpipe assembly similar to that shown in FIG. 2 was attached to a conventional swivel. The washpipe had an outside diameter of 2.500 inches and each mounting sleeve had an inside diameter of 3.500 inches. The packing in each sleeve included a phosphor bronze (SAE 660) anti-extrusion ring 2.504 inches in inside diameter, 3.250 inches in outside diameter, and 0.250 inches in height. A polytetrafluoroethylene ring 3.499 inches in outside diameter, 2.501 inches in inside diameter, and 0.625 inches in height was counterbored to provide a recess having an inside diameter of 3.250 inches and an axial dimension of 0.250 inches. The anti-extrusion ring was inserted into the recess and this assembly was then inserted into the mounting sleeve. Four self-sealing "W" elastomer rings were then placed in the sleeve. In the assembly tested, the upper packing provided a dynamic seal between the stationary sleeve and the rotating washpipe whereas the lower packing provided a static seal between the corotating sleeve and washpipe.

Water was circulated through the swivel at pressures ranging between 10,000 and 15,200 psi while the swivel stem was rotated at about 150 rpm. The test was conducted for 41.5 hours with only a slight amount of leakage noted near the end of the test. Following the test, the rings of the upper packing were removed for inspection. The metal anti-extrusion ring was worn along the surface engaging the end wall of the sleeve and along its interior surface. This indicates that the anti-extrusion ring 39 rotated part of the time with the washpipe and remained stationary part of the time with the sleeve. The plastic ring extruded inwardly between the end wall of the sleeve and the confronting surface of the anti-extrusion ring providing lubrication at the sliding surface. There was also evidence that the plastic material provided lubrication between the interior of the anti-extrusion ring and the washpipe.

The above test demonstrates that a swivel provided with the washpipe assembly of the present invention can be used successfully in high pressure drilling operations.

I claim:

1. An assembly for use in a swivel having two relatively rotatable, fluid conducting members, said assembly comprising
   a sleeve adapted to be secured to one of said members, said sleeve including an inwardly extending end wall having an opening formed therein;
   a tube extending through said opening and having an end portion disposed in said sleeve and therewith defining an annular space, said tube and said sleeve being relatively rotatable;
   means for connecting said tube to the other of said members;
   a resin ring having an internal axially extending recess formed therein;
   a circumferentially continuous anti-extrusion ring of a soft bearing metal having a Brinnel hardness less than about 100 positioned in said recess and substantially filling said recess, said resin ring having a skirt portion which substantially surrounds the outer periphery of said anti-extrusion ring, and said resin ring and said anti-extrusion ring being positioned in said sleeve wherein said resin ring engages the inner surface of said sleeve and the outer periphery of said tube under pressurized conditions and wherein said anti-extrusion ring engages said end wall and the outer periphery of said tube; and
   at least one seal ring mounted in said sleeve to substantially seal said annular space, said seal ring being adapted to act on said resin ring to transmit hydraulic forces thereto.

2. An assembly as defined in claim 1 wherein said resin ring is composed of a fluoroplastic.

3. An assembly as defined in claim 2 wherein said fluoroplastic is polytetrafluoroethylene.

4. An assembly as defined in claim 1 wherein said bearing metal is a copper alloy.

5. An assembly as defined in claim 1 wherein said bearing metal is a bronze alloy.

6. An assembly as defined in claim 1 wherein said recess formed in said resin ring and said anti-extrusion ring are complementary shaped and wherein said recess is sized in relation to said anti-extrusion ring such that a portion of the resin ring substantially covers the outer periphery of said anti-extrusion ring.

7. An assembly as defined in claim 6 wherein said portion has a radial thickness of at least 1/16 of an inch.

* * * * *